(12) United States Patent
Pecar et al.

(10) Patent No.: US 6,589,430 B1
(45) Date of Patent: Jul. 8, 2003

(54) CONTROLLING THE SUPPLY OF BODYFEED TO A FILTER

(75) Inventors: Michael A. Pecar, Aspendale Gardens (AU); Michael J. Lees, Mill Park (AU); Duncan A. Campbell, Kuraby Queensland (AU)

(73) Assignee: Carlton and United Breweries, Southbank (AU)

( * ) Notice: Subject to any disclaimer, the term of this patent is extended or adjusted under 35 U.S.C. 154(b) by 0 days.

(21) Appl. No.: 09/806,981

(22) PCT Filed: Oct. 5, 1999

(86) PCT No.: PCT/AU99/00854

§ 371 (c)(1),
(2), (4) Date: May 24, 2001

(87) PCT Pub. No.: WO00/20094

PCT Pub. Date: Apr. 13, 2000

(30) Foreign Application Priority Data

Oct. 5, 1998 (AU) .................................................. PP6332

(51) Int. Cl.⁷ .............................................. B01D 37/02
(52) U.S. Cl. .......................... 210/741; 210/90; 210/94; 210/96.1; 210/193; 210/745; 210/778
(58) Field of Search ........................ 210/96.1, 97, 143, 210/193, 739, 741, 745, 777, 778, 90, 94; 700/266, 273, 275, 282; 706/52; 426/495

(56) References Cited

U.S. PATENT DOCUMENTS

| | | | | |
|---|---|---|---|---|
| 2,971,648 A | * | 2/1961 | Lane et al. | |
| 3,618,766 A | * | 11/1971 | Morey | |
| 3,693,797 A | | 9/1972 | Topol | 210/193 |
| 4,118,778 A | * | 10/1978 | Strub | 210/193 |
| 4,514,306 A | * | 4/1985 | Pato | 210/741 |
| 5,236,601 A | * | 8/1993 | Snell et al. | 210/741 |
| 5,300,234 A | * | 4/1994 | Oechsle et al. | 210/778 |
| 5,589,076 A | * | 12/1996 | Womack | 210/739 |
| 5,879,557 A | * | 3/1999 | Strohm et al. | 426/495 |
| 6,063,292 A | * | 5/2000 | Leung | 210/739 |

FOREIGN PATENT DOCUMENTS

| | | |
|---|---|---|
| DE | 42 07 564 A1 | 9/1993 |
| WO | WO 98/05402 | 2/1998 |

\* cited by examiner

*Primary Examiner*—Joseph Drodge
(74) *Attorney, Agent, or Firm*—Paul T. Clark; Clark & Elbing LLP (57) ABSTRACT

The invention features a control system for controlling the supply of bodyfeed to a filter for removing solids from a beer stream is described. By applying the bodyfeed at an appropriate rate and hence achieving appropriate effective bed voidage it is possible to maintain beer clarity while minimizing filter aid usage. The control system includes a means for determining turbidity of the liquid stream upstream of the filter, a means for determining the rate of pressure drop change across the filter, and a controller for altering the supply of bodyfeed to the filter in accordance with a calculated dose change.

16 Claims, 4 Drawing Sheets

FIG_4.

FIG_5.

CONTROLLING THE SUPPLY OF BODYFEED TO A FILTER

The present invention relates to controlling the supply of bodyfeed to a filter for removing solids from a liquid stream and relates particularly but not exclusively to removing yeast and haze from a beer stream.

Breweries around the world have been primarily using kieselguhr, or diatomaceous earth (DE), filters for primary filtration of "green" beer for over 50 years. DE is essentially comprised of skeletal remains of microscopic organisms which are mined and then processed to produce highly porous diatoms. DE is ideal for removing yeast and haze solids from "green" beer. Alternatively, DE may be substituted with perlites, silica gels or alterative filter aids.

The basic primary filtration units used are horizontal leaf, vertical leaf or candle filters. Irrespective of the filter type used, the mode of filtration of "green" beer uses the same basic principles. The filter septum or screen used in each type of filter typically has apertures of approximately 50 μm. The DE acts as a filter aid for removing solids from the beer. Precoating the filter with a course-grade DE, and then using a fine-grade DE as a bodyfeed, can remove beer suspended solids down to a size of approximately 1 μm.

The correct application of bodyfeed maintains a microstructure with high porosity and high effective bed voidage (EBV). EBV describes the capacity of filter cake to trap beer solids, which influences the clarifying capability of the filter aid.

Two of the major challenges with beer filtration are, determining the correct grade of filter aid to use, and applying bodyfeed at the correct rate. This depends largely on the characteristics of the green beer to be processed.

Bodyfeed should be applied at an appropriate rate to maintain adequate porosity, maintain beer clarity and minimise filter aid usage, thereby maximising filter run times and minimising costs.

Savings may be achieved by reduced filter aid consumption, reduced filter aid disposal costs (which are destined to rise substantially in the future) and less frequent filter down times. There are also secondary benefits in the form of increased productivity and quality control. For example, in existing systems a number of filters are run in parallel and as they become clogged with material they must be taken off-line and cleaned. Thus, if they can be kept in service for longer by efficient application of bodyfeed, there is less down time.

In known filtration processes bodyfeed is generally controlled manually, if at all. In many situations, the dosing pumps are set to high bodyfeed rates and are not changed during filtration runs. Alternatively, a human operator controls the dosing pump guided by their understanding of the process. An operator is required to make a judgement as to whether the dosing should be varied based on their own experience.

From the applicant's experience, it is known to be desirable to maintain a constant increase of pressure drop across the filter of 20–40 kPa/hr. Pressure drop increases of less than 20 kPa/hr indicate overdosing (or too course a filter aid is being used and the structure is too porous) and the dosing action needs to be reduced. Pressure drop increases of greater than 40 kPa/hr indicate that the EBV is too low (or too fine a filter aid is being used and the structure is not sufficiently porous) and the dosing action needs to be increased.

One known system for controlling bodyfeed dosing relies on measuring the turbidity of the beer stream as it approaches the filter and on modelling the EBV of the DE filter aid. This system is very cumbersome and requires substantial operator input to the mathematical model of the EBV.

Problems arise when attempting to control the filter dosage because significant variations can occur in the characteristics of the DE. Furthermore, turbidity probes for measuring upstream turbidity of the beer are not able to discriminate between different beer solids, which have very different effects on filtration. A control system based on such measurements is generally unsatisfactory.

Therefore, it would be desirable to provide a control system which provides more accurate control of the dosing of the DE bodyfeed to the filter and which does not require experienced operator control.

Accordingly, there is provided a control system for controlling the supply of bodyfeed to a filter for removing solids from a liquid stream, including:

turbidity determining means for determining turbidity of the liquid stream upstream of the filter;

pressure drop change determining means for determining the rate of pressure drop change across the filter; and a controller having dose change calculation means for calculating a dose change from a determined turbidity and a determined rate of pressure drop change, and altering means for altering the supply of bodyfeed to the filter in accordance with a calculated dose change.

Preferably, the control system further includes trend determining means for determining a trend of the rate of pressure drop change and wherein the dose change means calculates the dose change from the determined trend of rate of pressure drop change in addition to the determined turbidity and determined rate of pressure drop change.

Preferably, the dose calculation means is a fuzzy controller.

Preferably, the fuzzy controller calculates the dose change in accordance with the following set of rules:

IF rate of pressure drop change is low AND trend of rate of pressure drop change is increasing AND turbidity is low THEN dose change is zero IF rate of pressure drop change is low AND trend of rate of pressure drop change is steady AND turbidity is low THEN dose change is –small IF rate of pressure drop change is low AND trend of rate of pressure drop change is decreasing AND turbidity is low THEN dose change is –large IF rate of pressure drop change is ideal AND trend of rate of pressure drop change is increasing AND turbidity is low THEN dose change is +small IF rate of pressure drop change is ideal AND trend of rate of pressure drop change is steady AND turbidity is low THEN dose change is zero IF rate of pressure drop change is ideal AND trend of rate of pressure drop change is decreasing AND turbidity is low THEN dose change is –small IF rate of pressure drop change is high AND trend of rate of pressure drop change is increasing AND turbidity is low THEN dose change is +large IF rate of pressure drop change is high AND trend of rate of pressure drop change is steady AND turbidity is low THEN dose change is +small IF rate of pressure drop change is high AND trend of rate of pressure drop change is decreasing AND turbidity is low THEN dose change is zero IF turbidity is high THEN dose change is +very large Preferably, the dose change calculation means includes aggregating means for aggregating the rules when more than one rule is fired so that said dose change is based on the aggregation of said rules.

Preferably, said aggregating means aggregates said rules in accordance with weightings allocated to each of said rules.

Preferably, the rule where turbidity is high is given a greater weighting than the rules where turbidity is low.

Preferably, the rule where turbidity is high is given a weighting approximately ten times the weighting of the rules where turbidity is low.

Preferably, the liquid stream is a beer stream.

The invention also provides a method for controlling supply of bodyfeed to a filter for removing solids from a liquid stream, including:

determining turbidity of the liquid stream upstream of the filter;

determining the rate of pressure drop change across the filter; and calculating a dose change from the determined turbidity and the determined rate of pressure drop change and altering the supply of body feed to the filter in accordance with the calculated dose change.

Preferably, the method further includes determining a trend of the rate of pressure drop change and the dose change is calculated from the determined trend of rate of pressure drop change in addition to the determined turbidity and determined rate of pressure drop change.

Preferably, the dose change is calculated by a fuzzy controller.

Preferably, the fuzzy controller calculates the dose change in accordance with the following set of rules:

IF rate of pressure drop change is low AND trend of rate of pressure drop change is increasing AND turbidity is low THEN dose change is zero IF rate of pressure drop change is low AND trend of rate of pressure drop change is steady AND turbidity is low THEN dose change is −small IF rate of pressure drop change is low AND trend of rate of pressure drop change is decreasing AND turbidity is low THEN dose change is −large IF rate of pressure drop change is ideal AND trend of rate of pressure drop change is increasing AND turbidity is low THEN dose change is +small IF rate of pressure drop change is ideal AND trend of rate of pressure drop change is steady AND turbidity is low THEN dose change is zero IF rate of pressure drop change is ideal AND trend of rate of pressure drop change is decreasing AND turbidity is low THEN dose change is −small IF rate of pressure drop change is high AND trend of rate of pressure drop change is increasing AND turbidity is low THEN dose change is +large IF rate of pressure drop change is high AND trend of rate of pressure drop change is steady AND turbidity is low THEN dose change is +small IF rate of pressure drop change is high AND trend of rate of pressure drop change is decreasing AND turbidity is low THEN dose change is zero IF turbidity is high THEN dose change is +very large Preferably, dose change is calculated by aggregating the rules when more than one rule is fired so that said dose change is based on the aggregation of said rules.

Preferably, said rules are aggregated in accordance with weightings allocated to each of said rules.

Preferably, the rule where turbidity is high is given a greater weighting than the rules where turbidity is low.

Preferably, the rule where turbidity is high is given a weighting approximately ten times the weighting of the rules where turbidity is low.

Preferably, the liquid stream is a beer stream.

An example of an embodiment of the invention will now be described in relation to the accompanying drawings in which.

According to an embodiment of the invention there is provided a control system for controlling the dosage of bodyfeed in the form of diatomaceous earth to a DE filter. By applying the bodyfeed at an appropriate rate and hence achieving appropriate effective bed voidage it is possible to maintain beer clarity whilst minimising filter aid usage. The control system of the preferred embodiment of the invention uses a combination of feed-back and feed-forward in order to control the application of bodyfeed to the filter.

It is known from the applicant's experience that it is desirable to maintain the rate of increase of pressure drop over the filter between 20 and 40 kPa/hr. It is known that if the pressure drop is less than 20 kPa/hr then the filter bed is too porous which can result in poor clarification of the beer stream. Conversely, if the pressure drop is greater than 40 kPa/hr then the filter bed is too tight and increased filter downtime may result. The control system of the preferred embodiment controls the application of bodyfeed so that the rate of pressure drop over the filter is within the acceptable values.

Figure 1:
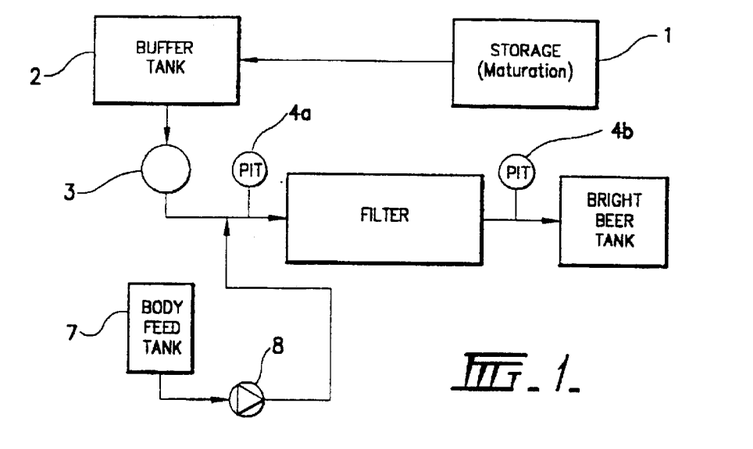
FIG. 1 is a schematic diagram showing the position of a filter in a beer filtration process for filtering a beer stream.

In FIG. 1, the beer filtration process is illustrated schematically. Green beer is matured in storage tank 1 before being fed downstream to buffer tank 2. The green beer is then fed further down stream through filter 5 which filters beer solids such as yeast and haze from the beer stream so that "bright" or filtered beer is collected in bright beer tank 6.

Bodyfeed tank 7 is upstream of the filter 5 and has a dosing pump 8 which allows the amount of bodyfeed supplied to the filter to be controlled. Turbidity determining means for determining turbidity are provided by turbidity probe 3 which measures the turbidity of the beer stream upstream of the filter 5. Pressure drop determining means are provided by pressure indicating transmitters 4a and 4b which allow the pressure drop across the filter to be measured.

Figure 2:
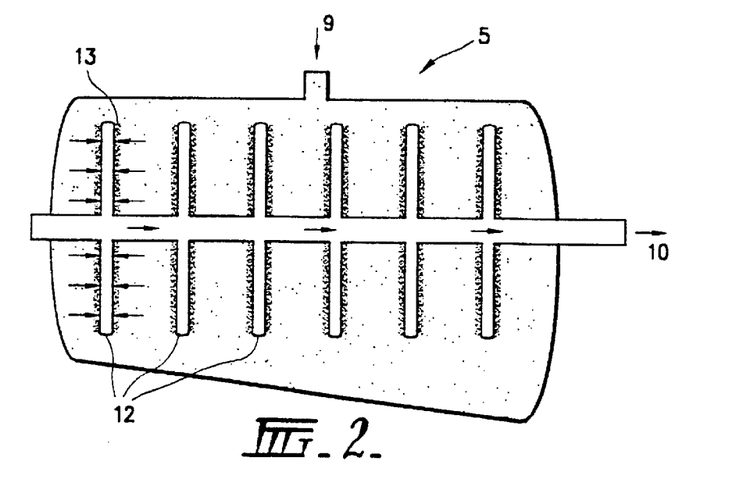
FIG. 2 shows a typical prior art filter used in a beer filtration process.

FIG. 2 shows a typical prior art filtration unit 5 removing yeast and haze from green beer. The illustrated filter is a vertical leaf filter, however it will be apparent to those skilled in the art that other types of filters can be used, such as horizontal leaf or candle filters.

In the filter illustrated in FIG. 2, the beer stream enters through input 9 so that unfiltered beer 11 surrounds each of the filter screens 12. The filter screens are of a fine mesh type material with apertures therethrough of approximately 50 μm. The outer surfaces of each of the filter screens is coated with a filter aid by using precoat which can come in a number of forms including DE, cellulose, perlite etc. As unfiltered beer 11 passes through the filter aid into the interior of each of the screens beer solids are removed from the beer stream before the beer flows out of output 10.

Figure 3:
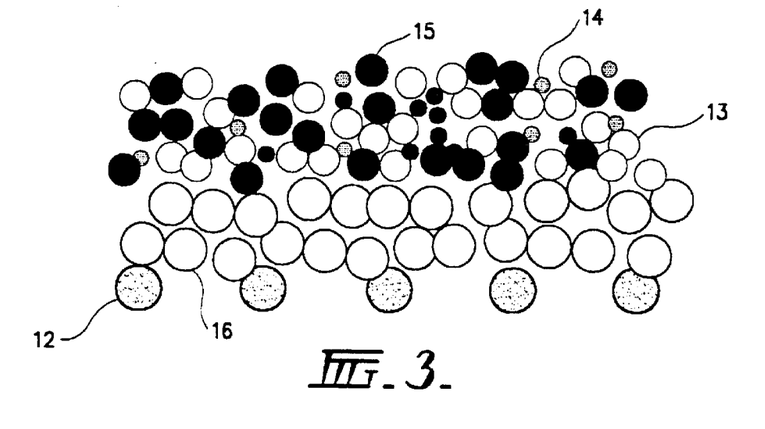
FIG. 3 shows the manner in which the bodyfeed acts as a filter aid to remove yeast and haze from "green" beer.

As shown in FIG. 3, the precoat, generally designated 16 reduces the apertures of the mesh from 50 μm to approximately 5. Some bodyfeed, generally designated 13 traps the yeast particles 15 while allowing some smaller beer particles 14 to pass through the filter.

Figure 4:
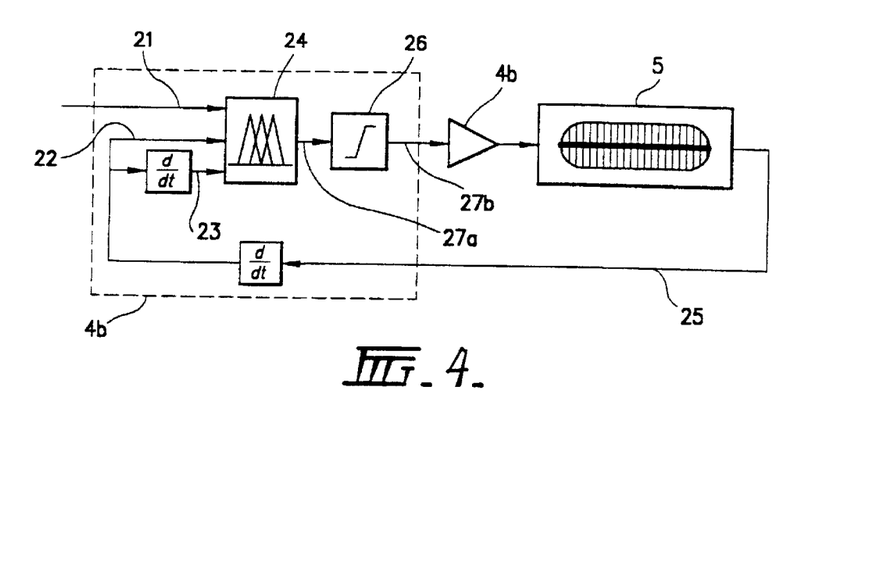
FIG. 4 is a schematic diagram showing a control system for controlling the dosage of the bodyfeed to the filter.

FIG. 4 shows the control system of the preferred embodiment for controlling the supply of bodyfeed to filter 5.

The pressure drop at 25 across the filter 5 is measured and fed back to the controller 20. The controller has pressure drop change determining means and trend determining means which determine the rate of change of pressure and the trend of rate of change of pressure respectively from the pressure drop measured across the filter by the pressure drop change determining means. The controller then feeds the determined rate of change of pressure drop and trend of rate of change of pressure drop as inputs 22 and 23 respectively to the dose change calculation means which is provided by a fuzzy controller 24. The turbidity is also determined by the turbidity determining means 3 and fed as input 21 to fuzzy controller 24.

The fuzzy controller then calculates the appropriate change to the dosage in accordance with the following set of rules:

1. IF rate of pressure drop change is low AND trend of rate of pressure drop change is increasing AND turbidity is low THEN dose change is zero: weighting 0.1
2. IF rate of pressure drop change is low AND trend of rate of pressure drop change is steady AND turbidity is low THEN dose change is −small: weighting 0.1
3. IF rate of pressure drop change is low AND trend of rate of pressure drop change is decreasing AND turbidity is low THEN dose change is −large: weighting 0.1
4. IF rate of pressure drop change is ideal AND trend of rate of pressure drop change is increasing AND turbidity is low THEN dose change is +small: weighting 0.1
5. IF rate of pressure drop change is ideal AND trend of rate of pressure drop change is steady AND turbidity is low THEN dose change is zero weighting 0.1
6. IF rate of pressure drop change is ideal AND trend of rate of pressure drop change is decreasing AND turbidity is low THEN dose change is −small: weighting 0.1
7. IF rate of pressure drop change is high AND trend of rate of pressure drop change is increasing AND turbidity is low THEN dose change is +large: weighting 0.1
8. IF rate of pressure drop change is high AND trend of rate of pressure drop change is steady AND turbidity is low THEN dose change is +small: weighting 0.1
9. IF rate of pressure drop change is high AND trend of rate of pressure drop change is decreasing AND turbidity is low THEN dose change is zero: weighting 0.1
10. IF turbidity is high THEN dose change is +very large: weighting 1.0

In some situations, more than one of these rules will be activated. For example, some turbidities, rates of pressure drop change and trends or rate of pressure drop change are considered to be neither completely high nor completely low. That is to say, they can belong partially to both the states low and high. Where the value of turbidity, rate of pressure drop change or trend of rate of pressure drop change belongs partially to more than one state more than one rule will be activated. If this is the case, the degree of activation of the rules depend on the degree to which turbidity, rate of pressure drop change or trend of rate of pressure drop change is a member of their respective membership functions. Furthermore, it has been found that turbidity has a greater influence on required dose change than other rules and therefore the rule where turbidity is high is given a greater weighting than the other rules where the turbidity is low. In the preferred embodiment, the high turbidity rule is given a weighting of 1.0 and the other rules are given a weighting of 0.1. The weightings can be varied, however it is preferable for the high turbidity rule to have a greater weighting. To further increase the effect this rule has on the dose change, when the high turbidity rule is fired it causes the dose to be changed by a positive very large amount or saturation.

The fuzzy controller 24 includes defuzzifiction means for calculating the crisp numerical equivalent of the aggregated dose change. The defuzzification means, defuzzifies the aggregated dose change recommendations to calculate a dose change which is used to control the dosing pump. For example, if turbidity belongs mainly to the high state and only to a small degree to the low state, then rules which require turbidity to be high will have the greatest effect on the net dose change.

Dose altering means are provided by the controller 20 then outputting signal 27b which is related to the calculated dose change via integrator 26 to the dosing pump 8 in order to alter the amount of bodyfeed being fed to the filter.

The three factors, turbidity, rate of pressure drop change and trend of rate of pressure drop change each impact on the process differently. Changes in turbidity allow the controller to react to major changes in the amount of solids within the beer feed stream quickly. However, because beers with identical measured turbidity can filter in vastly different manners, the pressure drop change is also measured to provide feedback as to the actual performance of the filter. The trend of pressure drop change is a measurement of the long term change in pressure drop which prevents over reaction being made by the controller to relatively instant changes in pressure drop across the filter. A controller which does not use the trend of pressure drop change will still control the amount of bodyfeed being fed to the filter but the control will be rougher because of greater reaction to instant changes in pressure drop.

Figure 5:
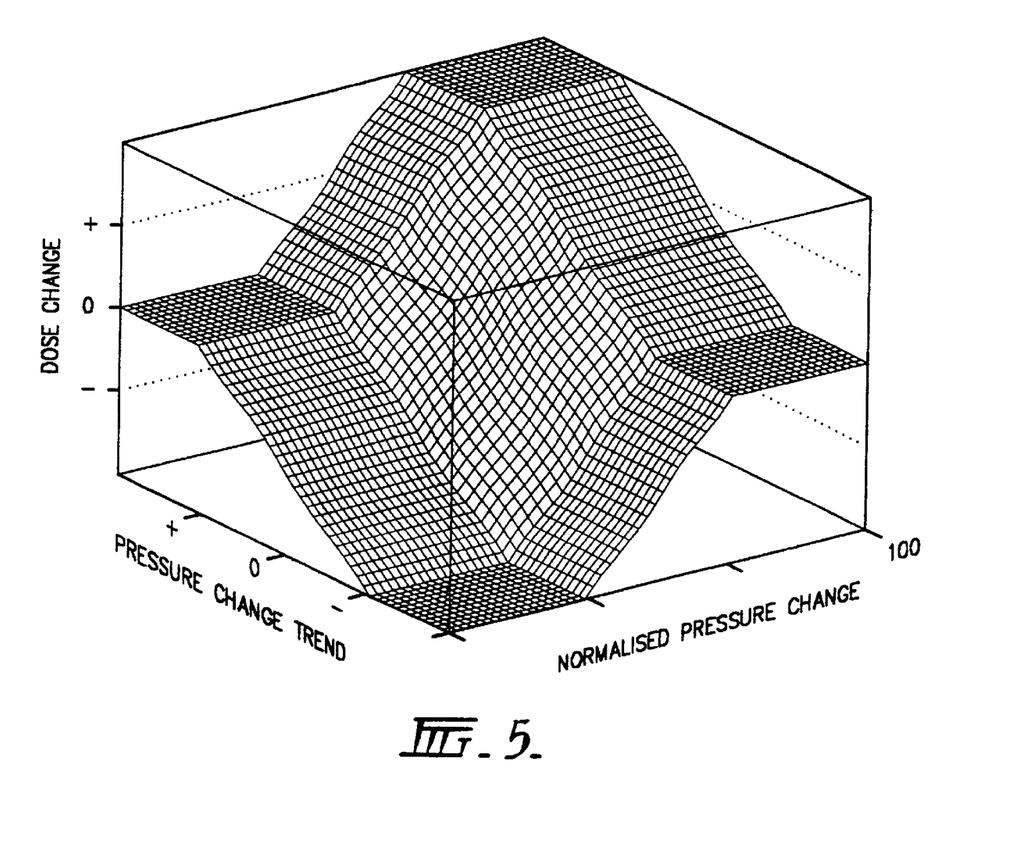
FIG. 5 shows one controller profile for controlling the pressure drop across the filter.

FIG. 5, represents the dose change relative to the pressure drop change trend and normalised pressure drop change according to a set of control rules of an embodiment of the invention for one level of inlet turbidity. There are potentially different control surfaces for every level of turbidity.

Figure 6:
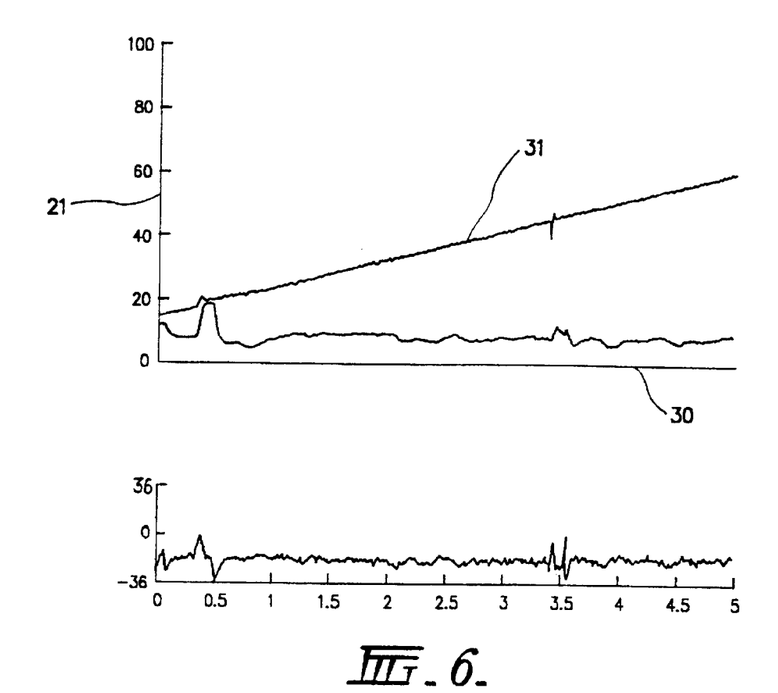
FIG. 6 is a graph showing the dose change suggested by a control system of an embodiment of the present invention when that control system is run in parallel to a filter controlled by an existing control system where turbidity is low.

In the top graph in FIG. 6, there is shown the normalised increase in pressure across the filter with respect to time 30 and the rate of change of pressure drop over a 5 hour period. This graph, represents the normal operation of a filter without using a controller and where turbidity was low. In FIG. 6, the filter pressure is increasing at a sub-optimal rate. This suggests that the filter is being overdosed with DE. A controller was run in parallel to the actual system and its recommended dose change is shown in the bottom of FIG. 6. The graph shows that the controller is suggesting that the dose of DE be decreased in order to increase the rate of change of pressure drop. From the major fluctuations during the run, it can be seen that the controller also produced desirable recommendations at these times. At about 0.4 hours into the run, when the rate of pressure drop change tended towards the predefined optimal value, the dose change recommend by the controller tended towards zero. Similarly, at 3.5 hours when the rate of pressure drop change increased, the controller recommended that the dose change be approximately zero.

In both cases, as the actual rate of pressure drop change moved markedly away from the desired rate of pressure drop change the controller recommended a large decrease in the amount of dosing.

FIGS. 7A to 7D show a set of membership functions for rate of pressure drop change, trend of rate of pressure drop change, turbidity and dose change respectively for the controller of the preferred embodiment.

Figure 7A:
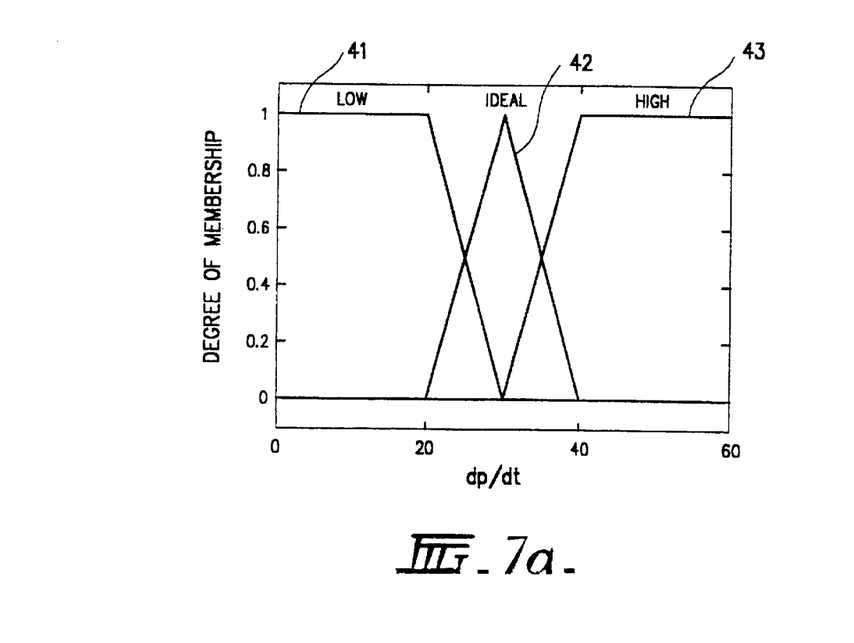
FIGS. 7A to 7D are a set of membership functions for a fuzzy controller according to an embodiment of the present invention.

FIG. 7A shows the membership functions for rate of pressure drop change—i.e. degree of membership v. rate of pressure drop change in kPa/hr. Membership function 41 indicates low pressure drop change. Membership function 42 indicates ideal pressure drop change. Membership function 43 indicates high rate of pressure drop change.

Figure 7B:
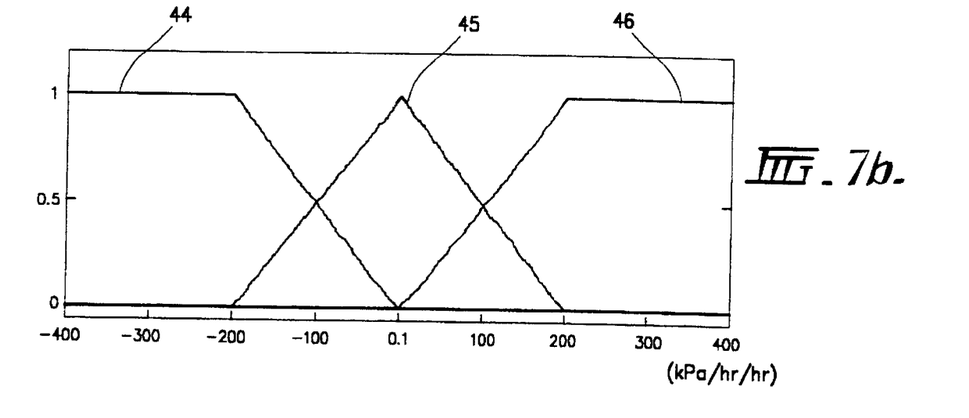

Similarly, FIG. 7B shows the membership function for trend of rate of pressure drop change—i.e. degree of membership v trend of rate of pressure drop change in kPa/hr/hr. Membership function 44 indicates decreasing trend of rate of pressure drop change. Membership function 45 indicates steady trend of rate of pressure drop change. Membership function 46 indicates increasing trend of rate of pressure change.

Figure 7C:
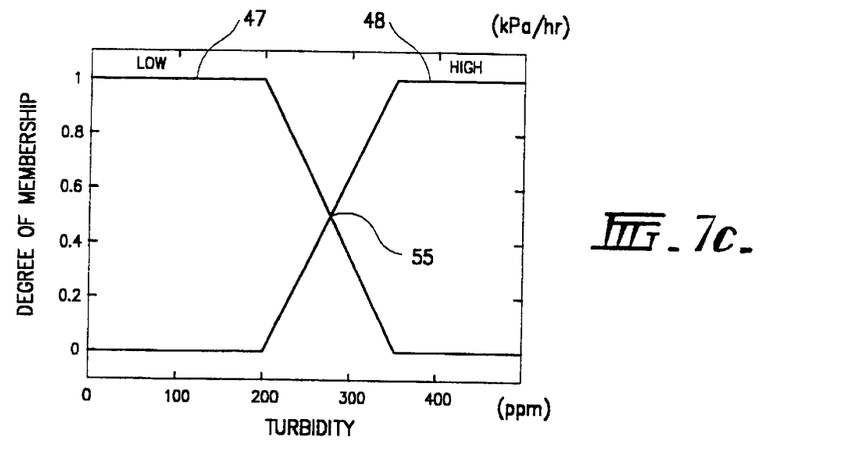

FIG. 7C shows the membership function for turbidity—i.e. degree of membership v turbidity in parts per million (ppm). Membership function 47 and 48 indicate low and high turbidity respectively.

Figure 7D:
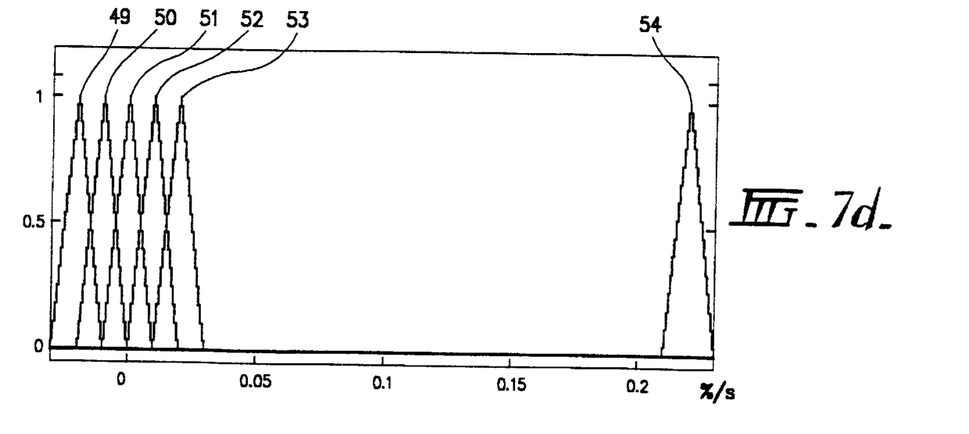

FIG. 7D shows the membership function for dose change where dose change is in percent per second (%/s). Membership function 49 indicates −large dose change. Membership function 50 indicates for −small dose change. Membership function 51 indicates for zero dose change. Membership function 52 indicates for +small dose change and Membership function 53 indicates for +large dose change. Membership function 54 indicates for +very large (or saturation) dose change.

It will be seen from these figures, that it is possible for the turbidity, rate of pressure drop change or trend of rate of pressure drop change to be considered to belong to more than one state. That is to say, a particular measurement may be considered to be partially one state and partially another state. For example, in the case of turbidity at the point marked 55, the turbidity is considered to be 50% low and 50% high.—i.e. 0.5 membership of low turbidity and 0.5 membership of high turbidity. In such situations, more than one rule of the rule set will be fired and therefore, aggregative means are provided to aggregate rule base result.

Taking an example where the rate of pressure change (dp/dt) is 15 kPa/hr, trend of rate of pressure change ($dp^2/dt^2$) is 0 kPa/hr/hr, and turbidity is 300 ppm. It can be seen from FIG. 7A that rate of pressure change belongs to "low". Also from FIG. 7B it can be seen that trend of rate of pressure change is "steady", and from FIG. 7C that turbidity is approximately 0.3 "low" and 0.7 "high". Therefore, rules two and ten of the rule set are fired. Referring to the rule set, rule two indicates a −very small dose change and rule ten indicates a +very large (or saturation) dose change. These dose changes are aggregated by the aggregating means to produce an overall dose change which will be predominantly saturated because of the weighting given to rule ten.

Modifications may be made to the invention as would be apparent to persons skilled in the art of controlling filtration including the art of beer filtration.

These and other modifications may be made without departing from the ambit of the invention the nature of which is to be determined from the foregoing description.

The claims defining the invention are as follows:

1. A control system for controlling the supply of bodyfeed to a filter for removing solids from a liquid stream, including:
    turbidity determining means for determining turbidity of the liquid stream upstream of the filter;
    pressure drop change determining means for determining the rate of pressure drop change across the filter and trend of pressure drop change rate; and
    a controller having dose change calculation means for calculating one of an unchanged dose, a small dose change, and a dose change from a determined turbidity and a determined rate of pressure drop change, and trend of pressure drop change rate and altering means for altering the supply of bodyfeed to the filter in accordance with a calculated dose change.

2. A control system as claimed in claim 1, wherein the dose calculation means is a fuzzy controller.

3. A control system as claimed in claim 2, wherein the fuzzy controller calculates the dose change in accordance with the following set of rules:
    IF rate of pressure drop change is low AND trend of rate of pressure drop change is increasing AND turbidity is low THEN dose change is zero
    IF rate of pressure drop change is low AND trend of rate of pressure drop change is steady AND turbidity is low THEN dose change is −small
    IF rate of pressure drop change is low AND trend of rate of pressure drop change is decreasing AND turbidity is low THEN dose change is −large
    IF rate of pressure drop change is ideal AND trend of rate of pressure drop change is increasing AND turbidity is low THEN dose change is +small
    IF rate of pressure drop change is ideal AND trend of rate of pressure drop change is steady AND turbidity is low THEN dose change is zero
    IF rate of pressure drop change is ideal AND trend of rate of pressure drop change is decreasing AND turbidity is low THEN dose change is −small
    IF rate of pressure drop change is high AND trend of rate of pressure drop change is increasing AND turbidity is low THEN dose change is +large
    IF rate of pressure drop change is high AND trend of rate of pressure drop change is steady AND turbidity is low THEN dose change is +small
    IF rate of pressure drop change is high AND trend of rate of pressure drop change is decreasing AND turbidity is low THEN dose change is zero
    IF turbidity is high THEN dose change is +very large.

4. A control system as claimed in claim 3, wherein the dose change calculation means includes aggregating means for aggregating the rules when more than one rule is fired so that said dose change is based on the aggregation of said rules.

5. A control system as claimed in claim 4, wherein said aggregating means aggregates said rules in accordance with weightings allocated to each of said rules.

6. A control system as claimed in claim 5, wherein the rule where turbidity is high is given a greater weighting than the rules where turbidity is low.

7. A control system as claimed in claim 6, wherein the rule where turbidity is high is given a weighting approximately ten times the weighting of the rules where turbidity is low.

8. A control system as claimed in any of claim 1 or any of claims 2–7, wherein the liquid stream is a beer stream.

9. A method for controlling supply of bodyfeed to a filter for removing solids from a liquid stream, including:
   determining turbidity of the liquid stream upstream of the filter;
   determining the rate of pressure drop change across the filter and trend of pressure drop change rate; and
   calculating one of an unchanged dose, a small dose change, and a large dose change from the determined turbidity and the determined rate of pressure drop change, and trend of pressure drop change rate and altering the supply of body feed to the filter in accordance with the calculated dose change.

10. A method as claimed in claim 9, wherein dose change is calculated by a fuzzy controller.

11. A method as claimed in claim 10, wherein the fuzzy controller calculates the dose change in accordance with the following set of rules:
   IF rate of pressure drop change is low AND trend of rate of pressure drop change is increasing AND turbidity is low THEN dose change is zero
   IF rate of pressure drop change is low AND trend of rate of pressure drop change is steady AND turbidity is low THEN dose change is −small
   IF rate of pressure drop change is low AND trend of rate of pressure drop change is decreasing AND turbidity is low THEN dose change is −large
   IF rate of pressure drop change is ideal AND trend of rate of pressure drop change is increasing AND turbidity is low THEN dose change is +small
   IF rate of pressure drop change is ideal AND trend of rate of pressure drop change is steady AND turbidity is low THEN dose change is zero
   IF rate of pressure drop change is ideal AND trend of rate of pressure drop change is decreasing AND turbidity is low THEN dose change is −small
   IF rate of pressure drop change is high AND trend of rate of pressure drop change is increasing AND turbidity is low THEN dose change is +large
   IF rate of pressure drop change is high AND trend of rate of pressure drop change is steady AND turbidity is low THEN dose change is +small
   IF rate of pressure drop change is high AND trend of rate of pressure drop change is decreasing AND turbidity is low THEN dose change is zero
   IF turbidity is high THEN dose change is +very large.

12. A method as claimed in claim 1, wherein dose change is calculated by aggregating the rules when more than one rule is fired so that said dose change is based on the aggregation of said rules.

13. A method as claimed in claim 12, wherein said rules are aggregated in accordance with weightings allocated to each of said rules.

14. A method as claimed in claim 13, wherein the rule where turbidity is high is given a greater weighting than the rules where turbidity is low.

15. A method as claimed in claim 14, wherein the rule where turbidity is high is given a weighting approximately ten times the weighting of the rules where turbidity is low.

16. A method as claim 9 in any of claims 10–15, wherein the liquid stream is a beer stream.

\* \* \* \* \*

UNITED STATES PATENT AND TRADEMARK OFFICE
CERTIFICATE OF CORRECTION

PATENT NO. : 6,589,430 B1
DATED : July 8, 2003
INVENTOR(S) : Pecar et al.

It is certified that error appears in the above-identified patent and that said Letters Patent is hereby corrected as shown below:

Column 8,
Lines 18-19, "turbidity and a determined rate" should be -- determined turbidity, a determined rate --.

Column 9,
Line 14, "turbidity and the determined rate" should be -- determined turbidity, the determined rate --.

Column 10,
Line 19, "claim 1" should be -- claim 11 --.

Signed and Sealed this

Twenty-seventh Day of July, 2004

JON W. DUDAS
*Acting Director of the United States Patent and Trademark Office*